US008098399B2

(12) United States Patent
Smith et al.

(10) Patent No.: US 8,098,399 B2
(45) Date of Patent: Jan. 17, 2012

(54) METHOD FOR CONTROLLING A FEED RATE OF A PRINTER, AND PRINTER EMPLOYING SAME

(75) Inventors: Keith M. Smith, Fairfield, CT (US); Gary S. Jacobson, Norwalk, CT (US); Brad L. Davies, Derby, CT (US); Elaine B. Cristiani, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 630 days.

(21) Appl. No.: 12/337,764

(22) Filed: Dec. 18, 2008

(65) Prior Publication Data

US 2010/0157327 A1 Jun. 24, 2010

(51) Int. Cl.
*G06F 3/12* (2006.01)

(52) U.S. Cl. .......................... 358/1.5; 358/1.1; 399/367

(58) Field of Classification Search ........................ None
See application file for complete search history.

(56) References Cited

U.S. PATENT DOCUMENTS 5,737,602 A * 4/1998 Lee ................................ 358/1.5
6,556,309 B1 4/2003 Campbell et al.
2008/0161966 A1 7/2008 Sharma et al.

* cited by examiner

*Primary Examiner* — Twyler Haskins
*Assistant Examiner* — Lennin Rodriguez
(74) *Attorney, Agent, or Firm* — Brian A. Lemm; Charles R. Malandra, Jr.; Steven J. Shapiro

(57) ABSTRACT

A method of controlling a feed rate of a printer, and a printer employing same, wherein the printer includes a feeder motor driving a feeder mechanism and a transport motor driving a transport mechanism. The method includes receiving image data for a first item of print media in a print job, processing the image data to create printable image data, and determining an image preparation time that is a time difference between the time when the printable image data is completed and the time when the start of the image data is first received. The method then further includes determining a current feeder speed based on at least the image preparation time. Following that that determination, the method includes: (i) turning the transport motor on, and (ii) setting a speed of the feeder motor equal to the current feeder speed and thereafter turning the feeder motor on.

10 Claims, 3 Drawing Sheets

METHOD FOR CONTROLLING A FEED RATE OF A PRINTER, AND PRINTER EMPLOYING SAME

FIELD OF THE INVENTION

The present invention relates to printing systems, and in particular to a printing system that includes a printer wherein the feed rate of the media is self adjusted so as to reduce and/or eliminate throttling in the printing system and therefore increase throughput.

BACKGROUND OF THE INVENTION

Addressing printer systems for printing information such as address information (e.g., destination and/or return address information) and other images, such as one or more logos, on a number pieces of print media, such as envelopes or paper, are known (for convenience, the term "image data" shall be used herein to refer to the entirety of the information that is printed on a piece of print media). In a typical addressing printer system, a host computer is operatively coupled to an addressing printer that includes a fixed print head, a transport mechanism, such as a number of belts forming a belt assembly, which transports the print media while being printed upon by the print head, and a feeding mechanism, such a number of rollers, which feeds the individual pieces of print media from a source of print media to the transport mechanism. The host computer electronically transmits the image data that is to be printed on each piece of print media to the addressing printer, which in turn prints the image data as the print media is being transported by the transport mechanism.

Preferably, during normal operation, the feeder motor which controls the feeding mechanism is continuously in an on condition. This continuous operation provides the maximum throughput that the feeding mechanism is capable of delivering. However, due to the speed of the transport mechanism and the length of the print media, there is a fixed amount of time available for the printer software to prepare the received (from the host computer) image data that is to be printed on each piece of print media. Furthermore, a piece of print media cannot be fed until the image data to be printed is ready to print. Thus, if the preparation time for a piece of image data is longer than it takes to feed a piece of print media, due to the complexity of the image data and/or a delay associated with the communications channel between the host computer and the printer, the feeding mechanism must be stopped while the image data preparation is completed. Only after the image data preparation is completed can the feeding mechanism be restarted. The delay caused by such stopping and restarting of the feeding mechanism (known in the art as "throttling") results in a lower throughput rate (i.e., lower than if the feeding mechanism was running continuously, even if such continuous operation was at a lower speed than the maximum). There is thus a need for systems and/or methods which reduce and/or eliminate throttling in printing systems.

SUMMARY OF THE INVENTION

In one embodiment, a method of controlling a feed rate of a printer, such as, without limitation, an addressing printer coupled to a host computer, is provided wherein the printer includes a feeder motor driving a feeder mechanism and a transport motor driving a transport mechanism. The method includes receiving image data for a first item of print media in a print job, processing the image data to create printable image data, and determining an image preparation time that is a time difference between the time when the printable image data is completed and the time when the start of the image data is first received. The method then further includes determining a current feeder speed based on at least the image preparation time. Following that that determination, the method includes: (i) turning the transport motor on, and (ii) setting a speed of the feeder motor equal to the current feeder speed and thereafter turning the feeder motor on. Preferably, the method further includes receiving job data relating to the print job that specifies a transport motor speed, wherein the step of turning the transport motor on includes setting the speed of the transport motor to be equal to the transport motor speed specified in the job data and thereafter turning the transport motor on.

In one particular embodiment, the method further includes receiving job data relating to the print job that includes at least a transport motor speed. In this embodiment, the step of determining the current feeder speed includes determining the current feeder speed based on at least the image preparation time and the transport motor speed. In another particular embodiment, the step of determining the current feeder speed includes ensuring that the current feeder speed is no more than a predetermined maximum feeder speed and no less than a predetermined minimum feeder speed.

In yet another particular embodiment, the method further includes printing the first item of print media after the transport motor and the feeder motor are turned, and sometime thereafter: receiving current image data for a subsequent item of print media in the print job, processing the current image data to create printable current image data, determining a subsequent image preparation time that is the time difference between the time when the printable current image data is completed and the time when a start of the current image data is received, determining a subsequent current feeder speed based on at least the subsequent image preparation time, and after the subsequent current feeder speed is determined, setting the speed of the feeder motor to be equal to the subsequent current feeder speed.

In another embodiment, a printer is provided that includes a print head, a transport mechanism for moving print media relative to the print head, a transport motor for driving the transport mechanism, a feeder mechanism for feeding the print media to the transport mechanism, a feeder motor for driving the feeder mechanism, and a processing unit operatively coupled to the transport motor and the feeder motor. The processing unit in this embodiment is adapted to perform one or more of the embodiments of the method just described.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

As employed herein, the statement that two or more parts or components are "coupled" together shall mean that the parts are joined or operate together either directly or through one or more intermediate parts or components. As employed herein, the term "number" shall mean one or an integer greater than one (i.e., a plurality).

Figure 1:
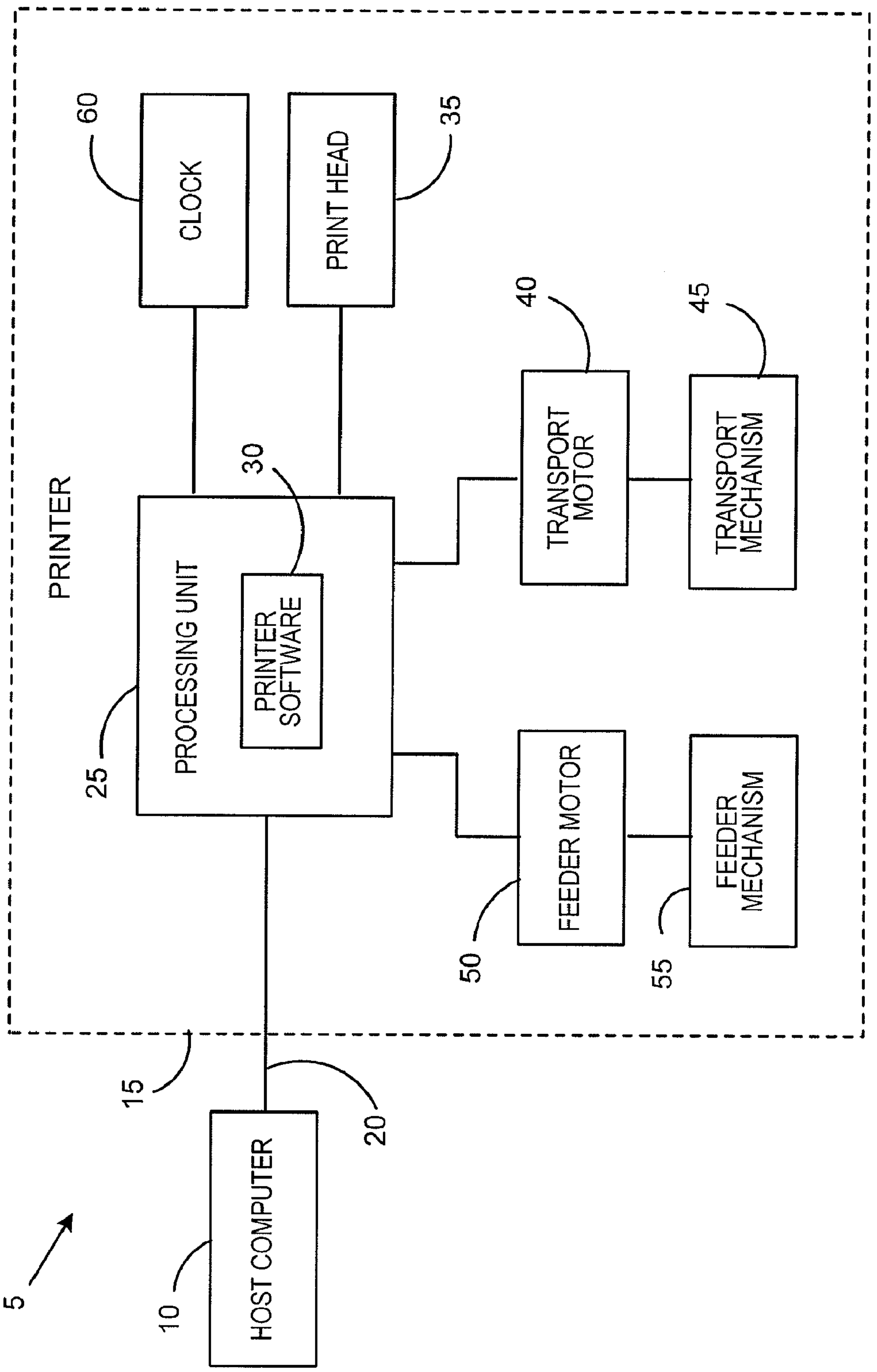
FIG. 1 is a schematic diagram of a printing system according to one particular, non-limiting embodiment of the invention.

FIG. 1 is a schematic diagram of a printing system 5 according to one particular, non-limiting embodiment of the invention. The printing system 5 includes a host computer 10, which may be, for example and without limitation, a PC, which is in electronic communication with a printer 15 through a communications channel 20. The communications channel 20 may be a wired connection, such as, without limitation, a USB connection, or a wireless connection implemented according to a suitable wireless protocol, such as, without limitation, a wireless protocol established according to the IEEE 802.11 set of standards.

As seen in FIG. 1, the printer 15 includes a processing unit 25, which may include a microprocessor, a microcontroller, or any other suitable processor, which is operatively coupled to a suitable memory for storing routines to be executed by the processing unit 25. Specifically, the memory, which may be separate from and/or internal to the microprocessor, microcontroller or other suitable processor, stores printer software 30 for implementing the methods of operation described in greater detail elsewhere herein.

In addition, the printer 15 includes a fixed print head 35 which is operatively coupled to and under the control of the processing unit 25. In the preferred embodiment, the fixed print head 35 is an ink jet print head, but it should be understood that other types of suitable print heads, such as, without limitation, thermal print heads, may also be used. The printer 15 also includes a transport motor 40 (such as, without limitation, a DC motor) which is operatively coupled to and under the control of the processing unit 25 and which drives a transport mechanism 45, such as a belt assembly including a number of belts, for transporting print media relative to the print head 35 so that information can be printed thereon by the print head 35. The printer 15 further includes a feeder motor 50 (such as, without limitation, a DC motor) which is operatively coupled to and under the control of the processing unit 25 and which drives a feeder mechanism 55, such as a number of rollers, for feeding individual pieces of print media from a source of print media (not shown) to the transport mechanism 45. Finally, the printer 15 includes a real time clock 60 which is operatively coupled to the processing unit 25 for providing time information to the processing unit 25 (alternatively, the real time clock 60 can be provided as part of the processing unit 25).

Figure 2:
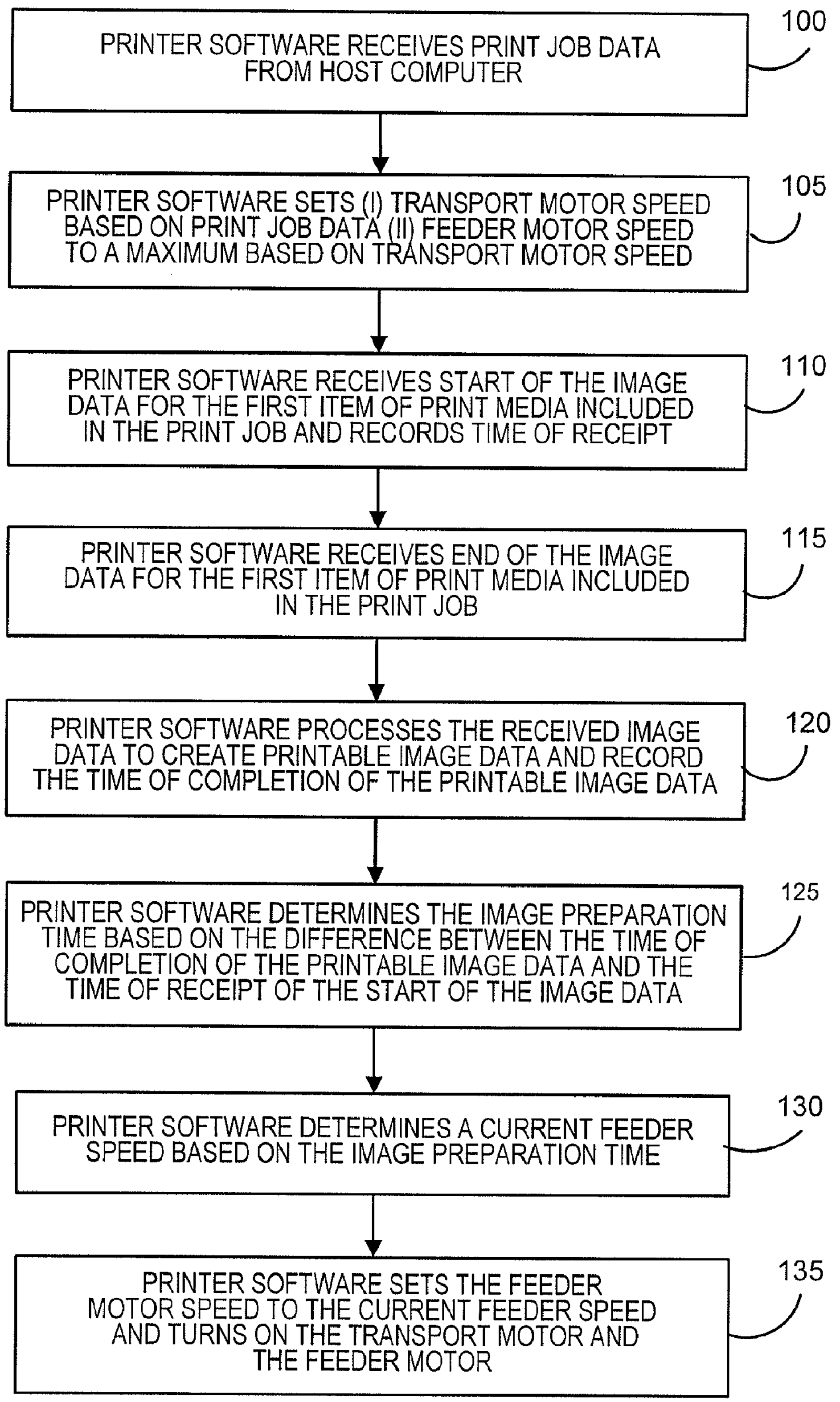
FIG. 2 is a flowchart showing one embodiment of a method of adjusting the speed of the feeder motor of FIG. 1 prior to initiating the printing of any print media in a given print job according to an aspect of the present invention.
Figure 3:
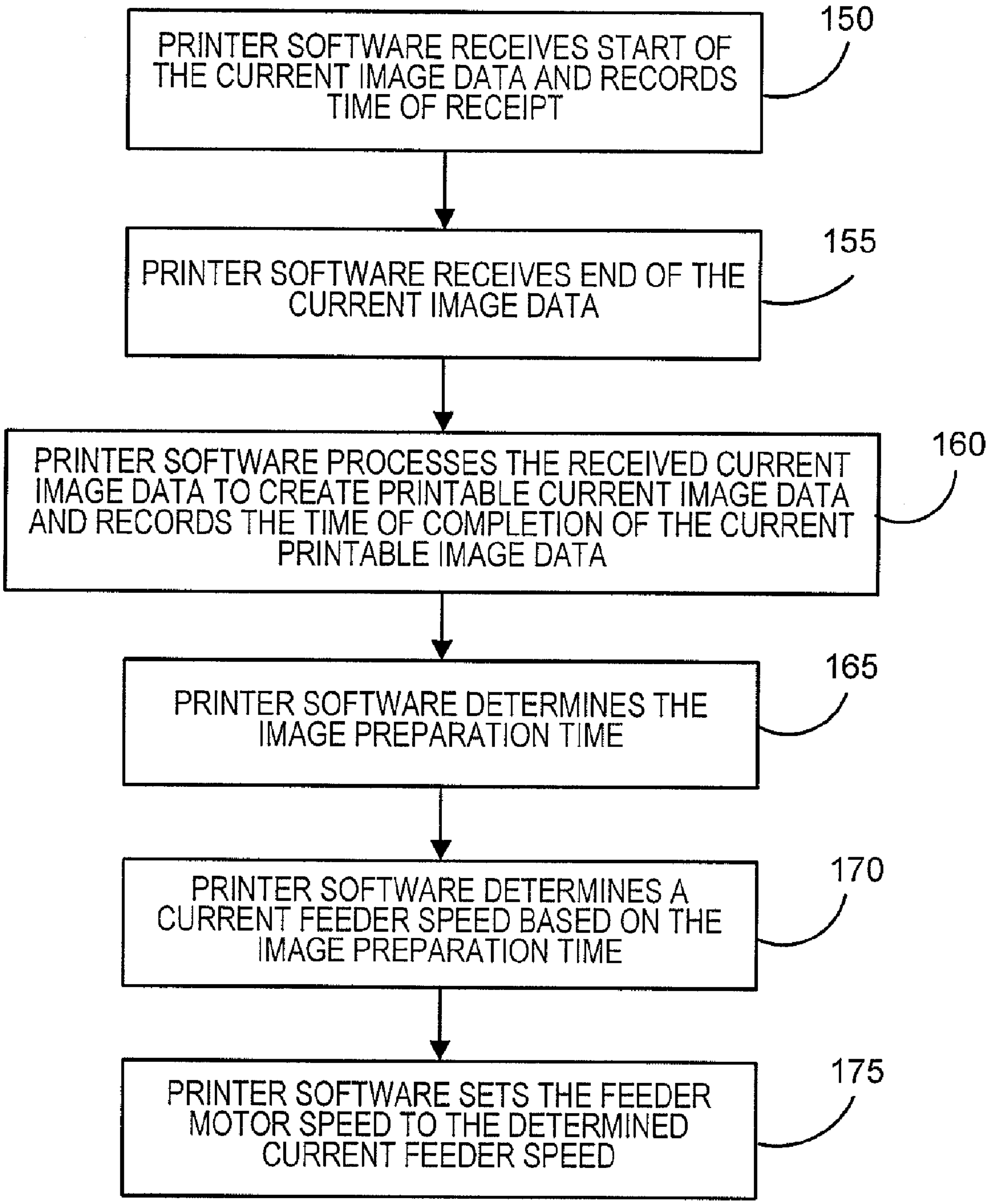
FIG. 3 is a flowchart showing one embodiment of a method of adjusting the speed of the feeder motor of FIG. 1 following the printing of the first print media in a given print job according to a further aspect of the present invention.

FIG. 2 is a flowchart showing one embodiment of a method of adjusting the speed of the feeder motor 50, and thus the rate of the feeder mechanism 55, prior to initiating the printing of any print media in a given print job according to an aspect of the present invention. FIG. 3 is a flowchart showing one embodiment of a method of adjusting the speed of the feeder motor 50, and thus the rate of the feeder mechanism 55, following the printing of the first print media in a given print job according to a further aspect of the present invention.

Referring to FIG. 2, the method begins at step 100, wherein the printer software 30 receives print job data relating to the current print job from the host computer 10 over the communications channel 20. As will be appreciated, the print job will specify that a plurality of pieces of print media are to be printed, each with specified image data. In the preferred embodiment, the print job data includes at least the speed at which the transport motor 40 is to operate during the print job. Next, at step 105, the printer software sets (i) the speed of the transport motor 40, and thus the speed of the transport mechanism 45, to be equal to the speed specified in the job data, and (ii) the speed of the feeder motor 50, and thus the speed of the feeder mechanism 55, to a maximum value based on the speed of the transport motor 40. Preferably, that maximum value is just below (e.g., a predetermined percentage of or some predetermined value between 75-97% of the speed of the transport motor 40 (referred to as the slowdown factor) in order to provide a tension to the print media being fed and prevent jams. Note, however, that at this point, the neither the transport motor 40 nor the feeder motor 50 have been turned on (i.e., they are idle).

Next, at step 110, the printer software 30 receives the start of the image data for the first item of print media included in the print job from the host computer 10 over the communications channel 20 and records the time of such receipt based on the input received from the clock 60. At step 115, the printer software 30 receives the end of the image data for the first item of print media included in the print job from the host computer 10 over the communications channel 20. Then, at step 120, the printer software 30 processes the whole of the received image data for the first item of print media included in the print job to create printable image data (i.e., data that allows the image data to actually be printed by the print head 35) and records the time of completion of the printable image data based on the input received from the clock 60. The processing that is performed at step 120 to create the printable image data may include, for example and without limitation, parsing the received image data and rendering the parsed data.

Next, at step 125, the printer software 30 determines the image preparation time based on the time difference between the time of receipt of the start of the image data for the first item of print media included in the print job recorded in step 110 and the time of completion of the printable image data recorded in step 120. At step 130, the printer software 30 then determines a current feeder speed based on (i.e., as a function of) the image preparation time determined in step 125. In a preferred, non-limiting embodiment, the current feeder speed is determined based on the image preparation time as follows. First, a first calculated feeder speed is calculated as a function of (i) the image preparation time, and (ii) the transport speed specified in the job data as described above. Next, a second calculated feeder speed is determined as the minimum of (i) the first calculated feeder speed, and (ii) the maximum feeder speed described above (which is based on the transport speed in the job data). In other words, at this point in the determination, the feeder speed is not allowed to exceed the maximum feeder speed. Finally, the current feeder speed is determined as the maximum of (i) the second calculated feeder speed, and (ii) a predetermined minimum feeder speed value chosen so as to avoid stalling. In other words, at this point in the determination, the feeder speed is not allowed to fall below the predetermined minimum feeder speed value. Following step 130, i.e., once the current feeder speed is determined, the method proceeds to step 135, wherein the printer software 30 sets the speed of the feeder motor 50, and thus the speed of the feeder mechanism 55, to the current feeder speed determined in step 130, and then turns on both the transport motor 40 and the feeder motor 50 so that feeding and printing can begin.

As noted above, FIG. 3 is a flowchart showing one embodiment of a method of adjusting the speed of the feeder motor 50 following the steps of FIG. 2, i.e., following the printing of the first item of print media in a given print job. In other words, the method of FIG. 3 is employed to adjust the feeder motor 50 while printing subsequent items of print media included in the print job (i.e., subsequent to the first item described in connection with FIG. 2). For illustrative purposes, the method of FIG. 3 will be described in connection with one such subsequent item of print media that is to be printed with particular image data sent from the host computer 10 (referred to as "current image data" in FIG. 3). As will be appreciated, the steps of FIG. 3 are repeated for each subsequent item of print media included in the print job. As a result, the speed of the feeder motor is continuously updated and adjusted with each print operation.

The method begins at step 150, wherein the printer software 30 receives the start of the current image data and records the time of such receipt based on the input received from the clock 60. At step 155, the printer software 30 receives the end of the current image data. Then, at step 160, the printer software 30 processes the received current image data to create printable current image data (i.e., data that allows the current image data to actually be printed by the print head 35) and records the time of completion of the printable current image data based on the input received from the clock 60. As noted elsewhere herein, the processing that is performed at step 160 to create the printable current image data may include, for example and without limitation, parsing the received current image data and rendering the parsed data.

Next, at step 165, the printer software 30 determines the image preparation time based on the time difference between the time of receipt of the start of the current image data recorded in step 150 and the time of completion of the printable current image data recorded in step 160. At step 170, the printer software 30 then determines a current feeder speed based on (i.e., as a function of) the image preparation time, preferably as described elsewhere herein. Finally, at step 175, the printer software 30 sets (adjusts) the speed of the feeder motor 50 to be equal to the current feeder speed determined in step 170.

Thus, the method(s) as shown in FIGS. 2 and 3 have been developed to recognize when images are too complex to render at the current feeder speed and adjust the feeder speed to slow it down to prevent starting and stopping of the feeder motor 50. The method(s) employ a forward feedback loop algorithm wherein the time to prepare (e.g., render) the current image is assumed to be similar to the time of the next image. This is a safe assumption in, for example, the mailing industry where each image of a print run is typically only different by the address being printed. Logos and other pictures are typically constant. Nonetheless, there may still be instances where an image may still be too complex or the host communication too slow such that slowing down the feeder motor 50 to its minimum speed will still not allow enough time to prevent the feeder mechanism 55 from stopping to wait for the image to be prepared. In such as case, the feeder motor 50 will be stopped and will wait until the image is ready to be printed before the feeder motor 50 is started again to feed the print media. In addition, as is apparent from the above description, as each new job is started, the feeder motor 50 is reset to its maximum speed. Thereafter, the time for each image is measured and the speed of the feeder mechanism 55 is adjusted image by image.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of controlling a feed rate of a printer having a feeder motor driving a feeder mechanism and a transport motor driving a transport mechanism, the method comprising:

- receiving image data for a first item of print media in a print job;
- processing said image data to create printable image data;
- determining an image preparation time, said image preparation time being a time difference between a time when said printable image data is completed and a time when a start of said image data is received;
- determining a current feeder speed based on at least said image preparation time;
- following said determining a current feeder speed: (i) turning said transport motor on, and (ii) setting a speed of said feeder motor equal to said current feeder speed and thereafter turning said feeder motor on; and
- feeding the first item of print media and printing an image corresponding to the image data on the first item of print media.

2. The method according to claim 1, further comprising receiving job data relating to said print job, said job data including at least a transport motor speed, wherein said turning said transport motor on comprises setting a speed of said transport motor equal to said transport motor speed and thereafter turning said transport motor on.

3. The method according to claim 1, wherein said determining a current feeder speed comprises ensuring that said current feeder speed is no more than a predetermined maximum feeder speed and no less than a predetermined minimum feeder speed.

4. The method according to claim 1, further comprising:

- receiving current image data for a subsequent item of print media in said print job;
- processing said current image data to create printable current image data;
- determining a subsequent image preparation time, said subsequent image preparation time being a time difference between a time when said printable current image data is completed and a time when a start of said current image data is received;
- determining a subsequent current feeder speed based on at least said subsequent image preparation time; and
- following said determining a subsequent current feeder speed, setting the speed of said feeder motor to be equal to said subsequent current feeder speed.

5. The method according to claim 4, further comprising receiving job data relating to said print job, said job data including a transport motor speed, wherein said determining a subsequent current feeder speed comprises determining the subsequent current feeder speed based on at least said subsequent image preparation time and said transport motor speed.

6. A printer comprising:

a print head;

a transport mechanism for moving print media relative to said print head;

a transport motor for driving said transport mechanism;

a feeder mechanism for feeding said print media to said transport mechanism;

a feeder motor for driving said feeder mechanism; and a processing unit operatively coupled to said transport motor and said feeder motor, said processing unit being adapted to:

receive image data for a first item of print media in a print job;

process said image data to create printable image data;

determine an image preparation time, said image preparation time being a time difference between a time when said printable image data is completed and a time when a start of said image data is received;

determine a current feeder speed based on at least said image preparation time; and after said current feeder speed is determined: (i) turn said transport motor on, and (ii) set a speed of said feeder motor equal to said current feeder speed and thereafter turn said feeder motor on.

7. The printer according to claim 6, wherein said processing unit is further adapted to receive job data relating to said print job, said job data including at least a transport motor speed, wherein said processing unit is adapted to turn said transport motor on by setting a speed of said transport motor equal to said transport motor speed and thereafter turning said transport motor on.

8. The printer according to claim 6, wherein said processing unit is adapted to determine a current feeder speed by ensuring that said current feeder speed is no more than a predetermined maximum feeder speed and no less than a predetermined minimum feeder speed.

9. The printer according to claim 6, wherein said processing unit is adapted to print said first item of print media after said transport motor is turned on and after said feeder motor is turned on using said print head, and wherein said processing unit is further adapted to:

receive current image data for a subsequent item of print media in said print job;

process said current image data to create printable current image data;

determine a subsequent image preparation time, said subsequent image preparation time being a time difference between a time when said printable current image data is completed and a time when a start of said current image data is received;

determine a subsequent current feeder speed based on at least said subsequent image preparation time; and after said subsequent current feeder speed is determined, set the speed of said feeder motor to be equal to said subsequent current feeder speed.

10. The printer according to claim 9, wherein said processing unit is adapted to receive job data relating to said print job, said job data including a transport motor speed, wherein said processing unit is adapted to determine a subsequent current feeder speed by determining the subsequent current feeder speed based on at least said subsequent image preparation time and said transport motor speed.

* * * * *